3,287,449
PREPARATION OF ARYL PHOSPHITES
Charles F. Baranauckas and Irving Gordon, Niagara Falls, N.Y., assignors to Hooker Chemical Corporation, Niagara Falls, N.Y., a corporation of New York
No Drawing. Filed Nov. 30, 1962, Ser. No. 241,164
5 Claims. (Cl. 260—976)

This invention relates to the preparation of phosphites. More particularly, it relates to high temperature preparation of aryl phosphites.

It is known to prepare aryl phosphites by reacting a phenolic composition with a trivalent phosphorus halide. In this reaction, which is usually carried out by heating the reactants up to the desired temperature, there is evolved hydrogen chloride. The gradual heating of the reactants in the preparation of aryl phosphites has some disadvantages. It causes sporadic, non-uniform and incomplete evolution of hydrogen chloride. This causes a reduction in the amount of the aryl phosphite which may be recovered. In view of this disadvantage, and in order to accommodate the peak evolution of hydrogen chloride, it has been necessary to over-design associated hydrogen chloride recovery systems. Also, because of the non-uniform evolution of hydrogen chloride, a longer reaction time and larger reaction vessels have been required to conduct the reaction.

It is, therefore, an object of this invention to cause a uniform evolution of hydrogen chloride in the preparation of aryl phosphites.

It is a further object of this invention to prepare aryl phosphites of high purity.

A still further object of this invention is the preparation of triaryl phosphites at an increased rate with a uniform evolution of HCl.

In accordance with the invention, it has been found that by continuously passing a mixture of a phenol, containing between 6 and 25 carbon atoms, and a trivalent phosphorus halide into a heated zone, maintained at a temperature of from about the boiling point of the phenolic composition to 75 degrees centigrade below the boiling point of the phenolic composition, a substantially instantaneous and complete reaction takes place.

It is preferred to carry out the process of the invention by continuously passing the mixture of phenolic composition and trivalent phosphorus through a preheated zone. However, the process of this invention may also be carried out by preheating the phenolic composition which contains between 6 and 25 carbon atoms, to a temperature which is from 0 degree to 75 centigrade degrees below the boiling point of the phenolic composition, followed by adding the trivalent phosphorus halide to the thus heated phenolic composition. The trivalent phosphorus halide may be added to the heated phenolic composition in any suitable manner, although it is preferred to add it beneath the surface of the preheated phenolic composition.

The phenolic compositions of this reaction may contain between 6 and 25 carbon atoms. Suitable phenols may be selected from the group consisting of phenol, o, m, p-cresols; o, m, p-fluorophenols; o, m, p-chlorophenols; o, m, p-bromophenols; o, m, p-iodophenols; o, m, p-aminophenols; o, m, p-nitrophenols; 2,4-dinitrophenol; resorcinol; hydroquinone; 2,4-xylenol; butylphenol; o-cyclohexylphenol; catechol; o, m, p-phenylphenols; 2,4-dichlorophenol; o-methoxyphenol; p-isopropylphenol; alpha-naphthol and beta-naphthol; p-tertiary butyl phenol; 2,4-dibromophenol; bisphenol-A; 4,4'-methylidenediphenol; 4,4'-propylidenediphenol; 2,2'-methylidenediphenol; 2,4-ethylidene diphenol; 2,2'-propylidene diphenol; 2,4-propylidene diphenol; 4,4',3,3-pentylidene diphenol; 4,4', 2,2', or 2,4,3-heptylidene diphenol; 4,4', 2,2' or 2,4,1,11-trichloro-2-ethylidene diphenol; 4,4', 2,2' or 2,4-diphenylmethylidene diphenol; 4,4', 2,2', or 2,4-thionylmethylmethylidene diphenol; ortho-tertiary butyl phenol; para-octylphenols; para-nonylphenols; para-decylphenols; ortho, meta, para, secondary-butyl phenols; amyl phenols; anol; eugenol, saligenin and thymol. It is especially suitable to utilize phenolic compositions containing between 6 and 15 carbon atoms.

The trivalent phosphorus halide composition which may be used in this invention may be designated by the formula:

$$R_xP\,Hal_{(3-x)}$$

in which Hal represents a halogen atom, and R represents an organic radical, i.e., aliphatic or aromatic radical, containing from about 1 to 18 carbon atoms, and $x$ is 0 to 2. The halogen may be selected from the group consisting of iodine, bromine, chlorine, and fluorine.

Suitable phosphorus halides for employment in the process according to the present invention are the phosphorus trihalides, especially phosphorus trichloride, and phosphorus tribromide and those phosphorus trihalides in which one or two halogen atoms have been replaced by an aliphatic or aromatic radical. Especially suitable are phosphorus trichloride, methyl phosphorus dichloride, dimethyl phosphorus chloride, methylethyl phosphorus chloride, phenyl phosphorus dichloride, diphenyl phosphorus chloride, distearyl phosphorus chloride, butyl phosphorus dichloride, ethylbenzyl phosphorus chloride, and the corresponding bromine compounds.

The reaction of the invention is carried out in a temperature range between 75 degrees centigrade below the boiling point and the boiling point of the phenolic composition. Usually, the reaction mixture is held below the boiling point, e.g., at least 1 degree centigrade below. Within the range given, it has been found that instantaneous evolution of hydrogen chloride is obtained and a substantially pure aryl phosphite is recovered. It is preferred, however, to maintain a temperature in a range above 150 degrees centigrade, with a satisfactory reaction being achieved when the temperature is maintained just below 200 degrees centigrade. It is especially suitable to utilize a temperature in the range of from 155 degrees to about 180 degrees centigrade. Still these temperatures should be from 1 degree to 75 degrees centigrade below the mentioned boiling point.

In the process of this invention, there is a reaction, even substantially instantaneous, with the accompanying and steady evolution of the theoretical amount of hydrogen chloride gas. This evolution of hydrogen chloride gas may be measured and furnishes a convenient means of estimating the rate of reaction.

The rate of reaction utilizing the process of this invention is greater than the processes known in the art. For example, the reaction when 3 moles of phenol are reacted with 1 mole of phosphorus trichloride, the phosphorus trichloride being added below the surface of the phenol, is such at a high temperature within the invention, e.g., 180 degrees centigrade, complete reaction is obtained, whereas at lower temperatures outside the described range, the reaction is not completed and undesired reactants are left. There are complete reaction and total regular evolution of HCl when the phenolic composition is maintained at a high temperature whereas there are incomplete reaction and sporadic HCl evolution when the process is carried out at the lower temperature.

The molarities of the reactants utilized in this invention may be predetermined by known techniques in accordance with the formula of the aryl phosphite desired. Triaryl phosphites, monohalide diaryl phosphites and dihalo monoaryl phosphites may be prepared in accordance with the process of this invention, depending upon the molarities utilized. It is especially suitable to react three moles of the phenolic composition with one mole of the trivalent phosphorus halide to obtain a triaryl phosphite.

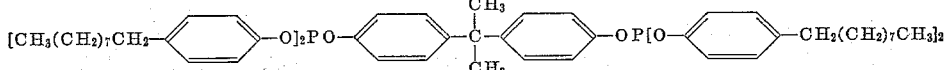

One may also react two moles of the phenolic composition with one mole of the trivalent phosphorus halide to obtain a monohalide diaryl phosphite. Also, one mole of the phenolic composition may be reacted with one mole of the trivalent phosphorus halide to obtain a dihalide monoaryl phosphite. Mixed aryl phosphite or alkyl aryl phosphites may be obtained by judicious selection of reactants and proportions. It is to be understood that the term "aryl phosphite" as used in the description herein refers to the type of phosphites indicated above.

The pressure during the reaction may be subatmospheric, atmospheric or superatmospheric, usually it is from 0.1 to 10 atmospheres.

The following examples are presented to illustrate the invention more fully without limiting it thereto. All parts and percentages are by weight and all temperatures are degrees centigrade unless otherwise specified.

*Example 1.—High temperature process*

Phenol (831 parts) held at 50 degrees centigrade in one addition vessel was passed together with phosphorus trichloride (352 parts) through a steam heated coil condenser held at 180 degrees centigrade. The evolved hydrogen chloride gas was measured by known techniques which indicated about 98 percent (±2 percent for experimental error) recovery of hydrogen chloride gas. An almost instantaneous formation, without sporadic evolution of hydrogen chloride gas was evident.

*Example 2.—Low temperature process*

Phosphorus trichloride (241 parts) was added beneath the surface of phenol (568.1 parts) held at a temperature of 70 degrees centigrade. The evolved hydrogen chloride gas was measured by known techniques which indicated about 85 percent (±2 percent for experimental error) recovery of hydrogen chloride gas. A relatively high Cl content was noted in the triphenyl phosphite product. An undesirable sporadic evolution of hydrogen chloride gas was noted during the period of reaction.

*Example 3.—Aryl phosphites*

Bisphenol - A (4,4' - isopropylidenediphenol) (228.3 parts) was charged into a vessel and heated to 155 degrees to 160 degrees centigrade. Phosphorus trichloride (302.3 parts) was added to the bisphenolic compound. A product was separated, which infrared analysis indicates to have the structural formula:

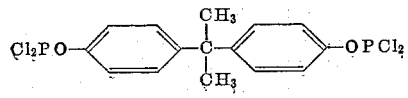

This composition was then transferred to a second vessel containing nonyl phenol (890.5 parts) held at 150 degrees centigrade. A tetranonylphenyl Bisphenol-A bis-phosphite of the structural formula:

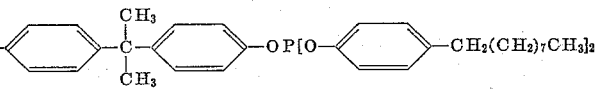

resulted.

Infrared analysis confirmed the qualitative identity of the above structure. The quantities of hydrogen chloride gas steadily emitted in this process were measured by known techniques. About 98 percent (±2 percent) recovery of the theoretical value was found, indicating a smooth and substantially instantaneous and complete reaction took place.

We claim:

1. A process for preparing a triaryl phosphite, wherein the aryl radicals are the same, which comprises heating a phenol having from 6 to 18 carbon atoms to a temperature from about 75 degrees below the boiling point to the boiling point of said phenol, passing said phenol and a trivalent phosphorus chloride having the formula $$R_xPCl_{(3-x)}$$

wherein R is a hydrocarbon aryl radical having from 6 to 18 carbon atoms and $x$ is 0 to 2, through a zone maintained at a temperature from about 75 degrees below the boiling point to the boiling point of the phenol, whereby a product substantially free of chlorine is obtained.

2. A process in accordance with claim 1 wherein the temperature of the zone is maintained above 150 degrees centigrade.

3. The process in accordance with claim 1 wherein the phenol is 4,4'-isopropylidenediphenol.

4. A process in accordance with claim 1 wherein the phenol is phenol.

5. The process in accordance with claim 4 wherein the trivalent phosphorus chloride is phosphorus trichloride.

References Cited by the Examiner

UNITED STATES PATENTS

| | | | |
|---|---|---|---|
| 2,170,833 | 8/1939 | Moyle | 260—461.315 |
| 2,193,252 | 3/1940 | Kyrides. | |
| 2,200,712 | 5/1940 | Carswell. | |
| 2,220,113 | 11/1940 | Moyle | 260—461.315 |
| 2,220,845 | 11/1940 | Moyle | 260—461.315 |
| 2,234,379 | 3/1941 | Martin | 260—461.315 X |

CHARLES B. PARKER, *Primary Examiner.*

IRVING MARCUS, *Examiner.*

F. M. SIKORA, R. L. RAYMOND, *Assistant Examiners.*